T. CARROLL & J. P. FRANK.
CASH REGISTER.
APPLICATION FILED AUG. 13, 1913.
1,230,862.
Patented June 26, 1917.
6 SHEETS—SHEET 1.
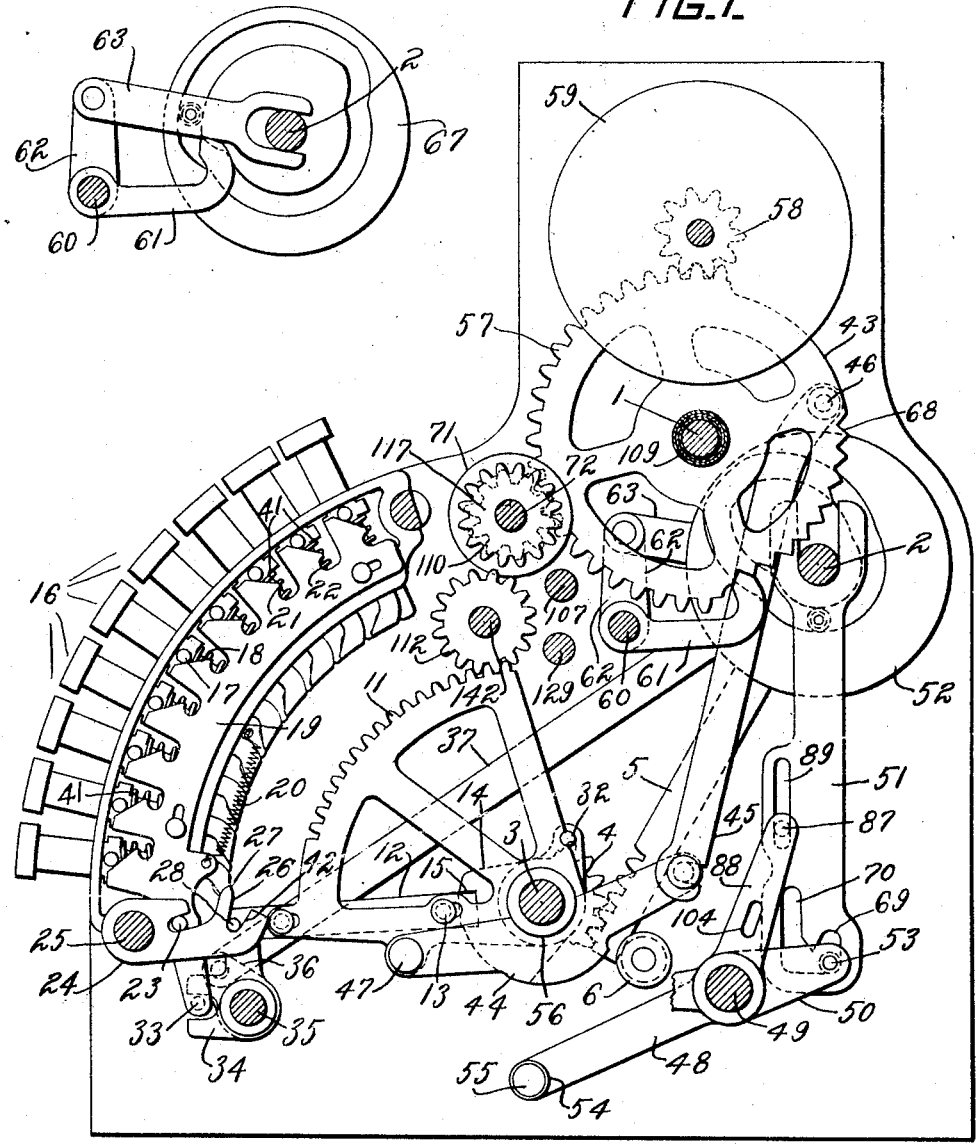
Witnesses
Inventors
Thomas Carroll
and John P. Frank
Attorneys

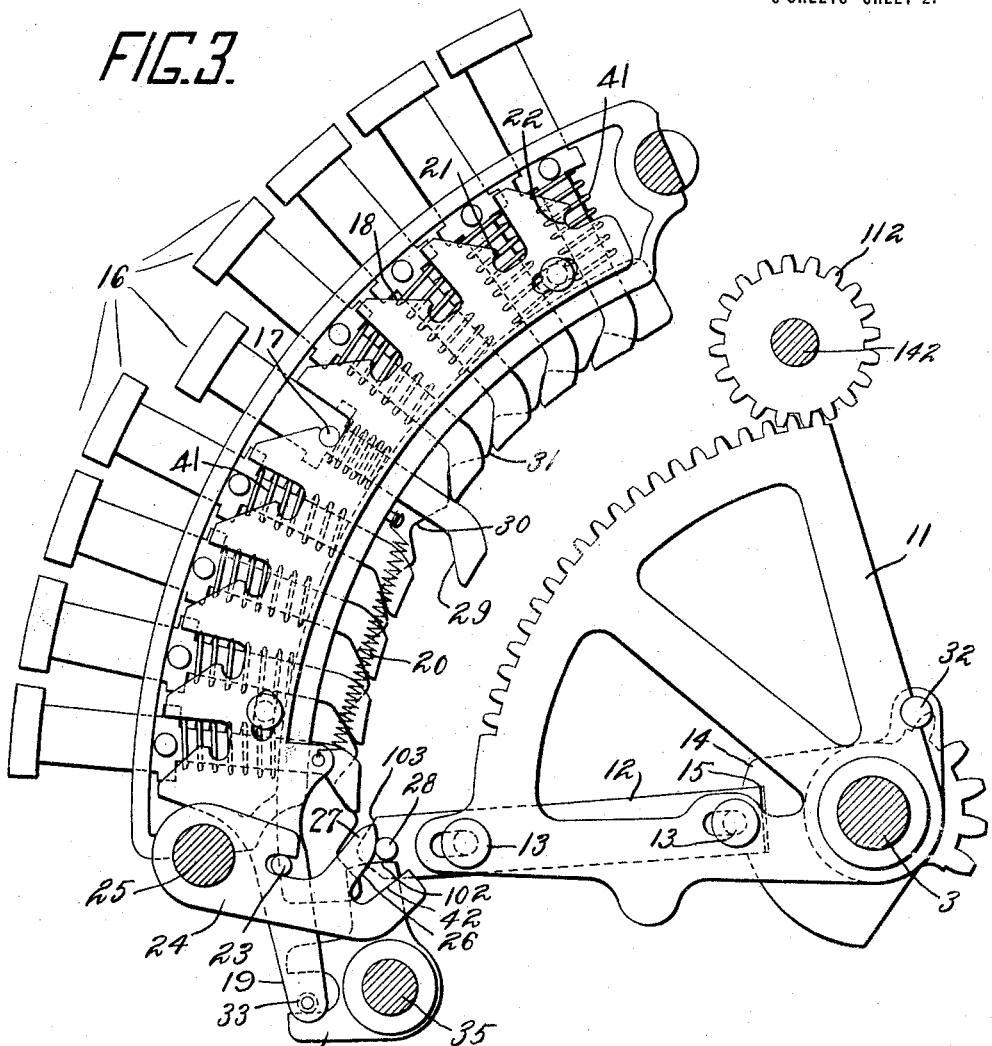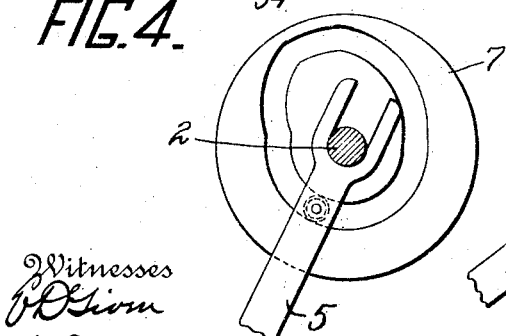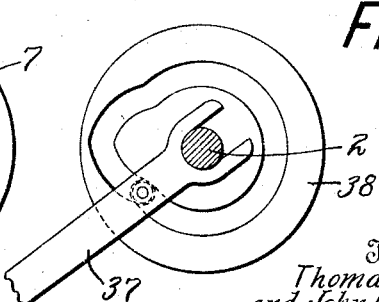

T. CARROLL & J. P. FRANK.
CASH REGISTER.
APPLICATION FILED AUG. 13, 1913.

1,230,862.

Patented June 26, 1917.
6 SHEETS—SHEET 3.

Witnesses

Inventors
Thomas Carroll
and John P. Frank
Attorneys

T. CARROLL & J. P. FRANK.
CASH REGISTER.
APPLICATION FILED AUG. 13, 1913.
1,230,862.
Patented June 26, 1917.
6 SHEETS—SHEET 4.
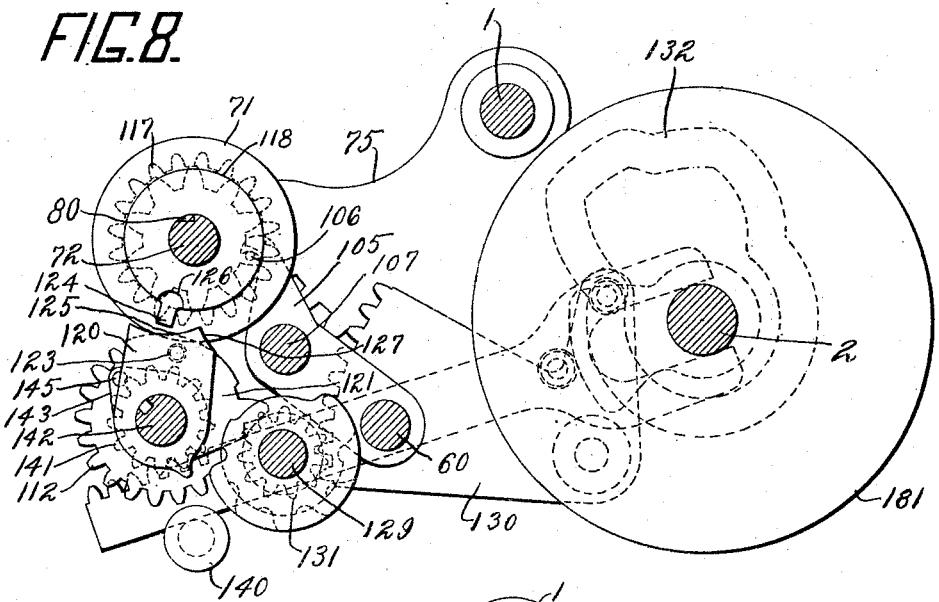
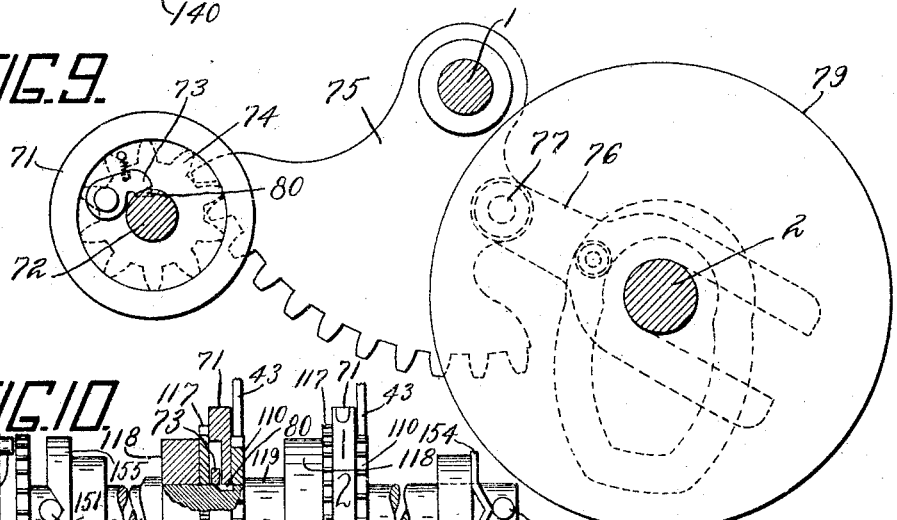
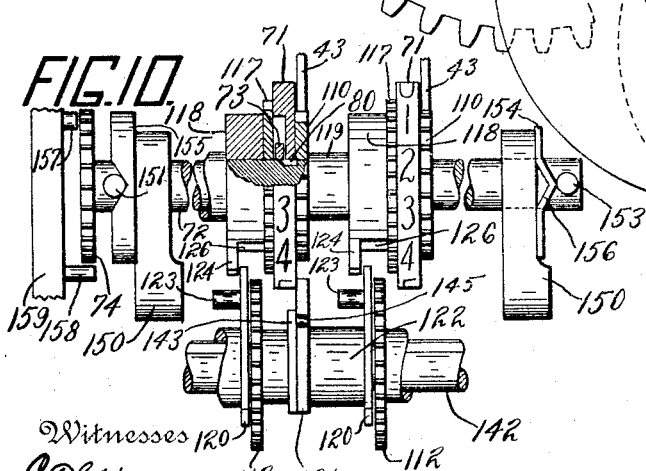
Witnesses
Inventors
Thomas Carroll
and John P. Frank

T. CARROLL & J. P. FRANK.
CASH REGISTER.
APPLICATION FILED AUG. 13, 1913.

1,230,862.

Patented June 26, 1917.
6 SHEETS—SHEET 5.

Witnesses

Inventors
Thomas Carroll
and John P. Frank

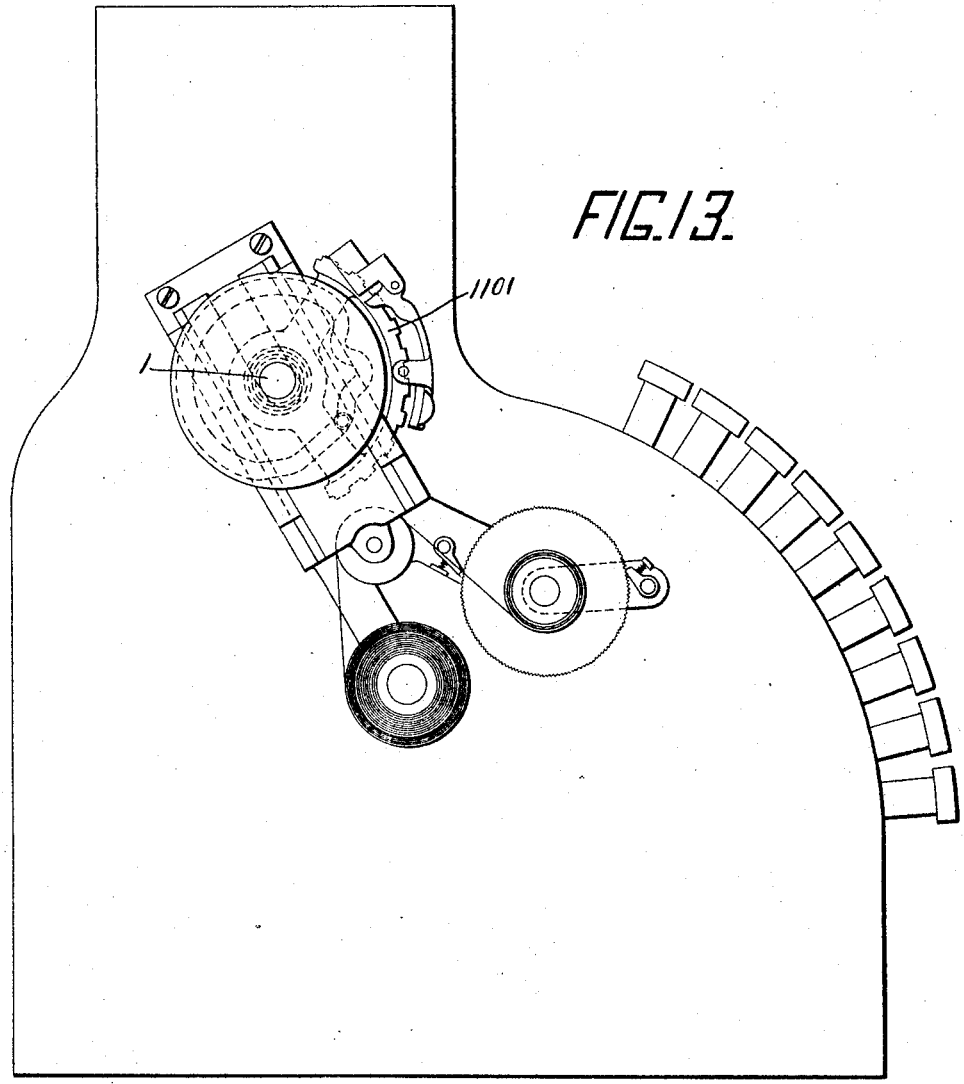

UNITED STATES PATENT OFFICE.

THOMAS CARROLL AND JOHN P. FRANK, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CASH-REGISTER.

1,230,862.          Specification of Letters Patent.      Patented June 26, 1917.

Application filed August 13, 1913. Serial No. 784,466.

*To all whom it may concern:*

Be it known that we, THOMAS CARROLL and JOHN P. FRANK, citizens of the United States, residing at Dayton, in the county of Montgomery and State of Ohio, have invented certain new and useful Improvements in Cash-Registers, of which we declare the following to be a full, clear, and exact description.

This invention relates to improvements in cash registers or accounting machines and particularly in the mechanism for operating the totalizing, printing and indicating devices.

One of the objects of this invention is to provide a simplified form of differential mechanism and means whereby the differential mechanism is positively connected with the main operating mechanism when the keys of the machine are pressed in.

Another object of the invention is to provide a simple and positive mechanism for resetting the totalizer to zero by operating the machine in a certain way. This is accomplished by a resetting actuator normally in engagement with a pinion on the totalizer shaft and which rotates the shaft on a resetting operation in the direction opposite to which the totalizer wheels are rotated on adding operations.

Another object is to provide mechanism for printing the total shown by the totalizer. The type carriers are normally connected positively by intermediate mechanism with the totalizer wheels so that the rotation of the totalizer wheels back to their zero positions on the resetting operation carries the type carriers away from their zero positions a corresponding number of divisions.

Still another object of the invention is to provide a simple and positively operated totalizer transfer mechanism.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Of said drawings:—

Figure 1 is a reduced sectional view of a machine showing the differential, totalizing and indicating mechanisms.

Fig. 2 is a detail of one of the indicator alining devices and the mechanism for operating the same.

Fig. 3 shows the differential mechanism in one of the banks of the machine and the means for connecting it with the main operating mechanism.

Fig. 4 is a detail of the differential actuating cam and pitman, part of the latter being broken away.

Fig. 5 is a detail of the cam and pitman for releasing the registering keys with part of the pitman broken away.

Fig. 8 shows the totalizer resetting, transfer operating, and transfer restoring devices.

Fig. 9 shows the totalizer resetting mechanism.

Fig. 10 shows two of the totalizer sections with part of transfer mechanisms.

Fig. 13 is a reduced left side elevation of the machine showing the printer.

Figure 6:
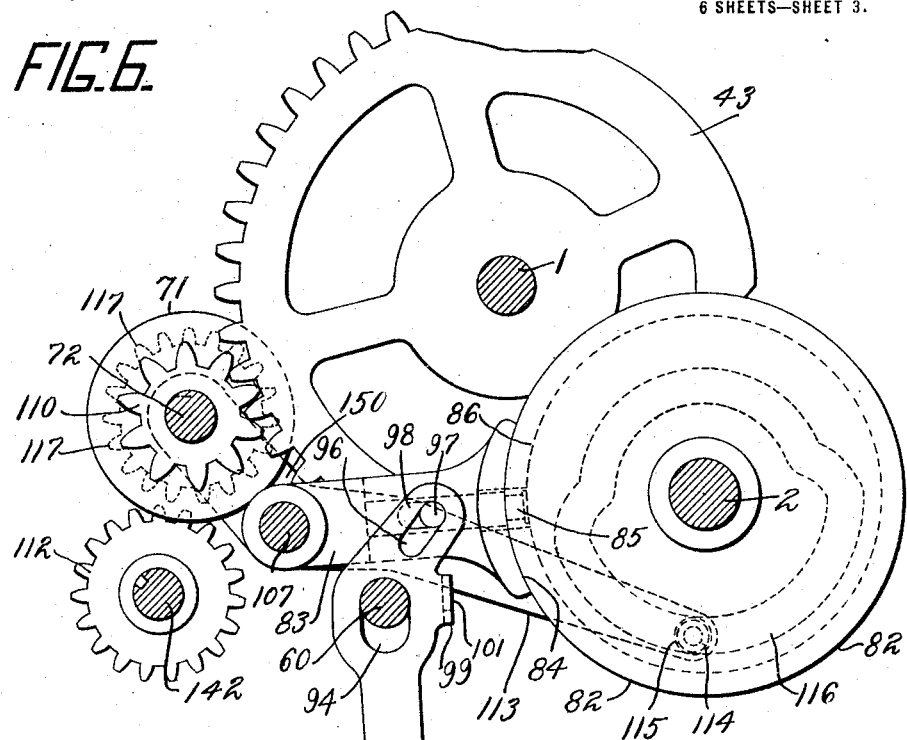
Fig. 6 shows the mechanism for shifting and rocking the totalizer and devices for preventing the shifting movement.

In the drawings and the description given below a specific embodiment of the invention is shown applied to a cash register of the type described in United States Letters Patent No. 580,378 granted Apr. 13, 1897, to Cleal and Reinhard. This register is used to illustrate the inventive idea because the form of differential mechanism that it has is peculiarly suited to use in explaining the operation and construction of the different improvements comprised by the invention. It is to be distinctly understood, however, that it is not the intention to limit the use of the invention to the particular type of register shown, as the improvement is one that can be applied in various forms to other cash registers and accounting machines.

In the machine shown in the drawings, there is a section comprising actuating, totalizing, indicating and printing devices for each row of keys. The general operation is very similar to operation of the corresponding parts in the Cleal and Reinhard machine mentioned. In the following description, the relation and operation of the parts in one bank or division only of the machine is usually described. This is done with the understanding that the mechanism in all of the banks is practically the same. It is possible to have any desired number of banks or rows of keys, depending upon the registering capacity wanted.

In the illustrative machine shown in the drawings, the power is transmitted through suitable means to the shafts 1 and 2 (Fig. 1), rotating the former in an anti-clockwise and the latter in a clockwise direction. The shaft 1 serves as a support for the indicator actuators 43 and parts attached to them and also operates the printing mechanism. The shaft 2 is the main operating shaft of the machine and practically all of the mechanism is driven from it. The rock shaft 3 carries and operates the differential mechanism.

Attached to the rock shaft 3 is a segment gear 4. Engaging the teeth of the segment gear is a rack 5 the lower end of which is supported by a guide roll 6, and the upper end by a fork which spans the shaft 2. The rack 5 is reciprocated by a cam 7 (Fig. 4), attached to the shaft 2, and, the rack acting with the segment gear 4, rocks the shaft 3 and all parts attached to it through an arc of about 90°. When one of the keys 16 (Figs. 1 and 3) is pressed in a pin 17 on the key acts against a beveled edge 18 of a detent plate 19 and forces the plate down against the tension of a spring 20 which has one end fastened to the detent plate and the other to the key bank frame. As the pin passes over a point 21, the detent plate is drawn upward by the spring 20 and a recess 22 will hold the key in its pressed position.

To release the keys at a later stage in the operation of the machine there is provided a mechanism connected with and operated by a pitman 37 (Fig. 1). The upper end of this pitman is supported by a fork spanning the shaft 2 and the lower end of it is pivotally attached to an arm, indicated by the dotted line 36, fastened to a shaft 35. The pitman is reciprocated by a cam 38 (Fig. 5), attached to the shaft 2 and rocks the shaft 35. Attached to the shaft 35 is a bell crank lever 34 with a slot engaging a stud 33 in the lower end of the detent plate 19. When the shaft 35 is rocked by the action of the parts just described in an anti-clockwise direction the upper side of the slot in the bell crank lever will bear down on the pin 33 and pull the detent plate 19 down far enough for the key pin 17 to pass out over the point 21. A spring 41 on the key will then return the key to its normal position and the pitman 37 will return the bell crank lever 34 to the position shown in Fig. 1.

A segment gear 11 which actuates the totalizer and establishes the position of the indicator actuator and the type carrier in a manner that will be explained later, is swung loose on the rock shaft 3. This segment gear carries a plate 12 slidably attached to the segment by rivets 13. Rigidly attached to the rock shaft is a locking plate 14 which has a cut 15 to receive the rear end of the plate 12. Near the lower end of the detent plate 19 is a pin 23 resting in a slot of the arm 24 which is pivoted on a rod 25. As the detent plate is forced down by the action of the key, in the manner above described, this pin 23 swings the arm 24 on the rod 25 and the inner surface 26 of an extension 27 on the arm will act against a pin 28 in the locking plate 12 and force it back along the upper end 102 of the bell crank lever 34 so that the rear end of the plate will engage the cut 15 in the locking plate 14. Then, as the shaft 3 is rocked, the segment gear 11 will be carried with it as long as the plate 12 is in engagement with the cut in the plate 14. Fig. 3 shows this differential mechanism with one of the keys pressed. The plate 12 is in engagement with the locking plate 14, and as the shaft 3 is rocked clockwise, the segment gear 11 is carried up until the stud 28 strikes a camming edge 29 of the key that has been pressed in. This camming edge will draw the plate 12 forward out of engagement with the notch 15 and force the end 103 of the plate into engagement with a notch 30 in a locking plate 31. The plate 12 is held into engagement with the notch 30 by its rear end resting on the curved edge of the locking plate 14, thereby holding the segment gear 11 stationary. The locking plate 14 will continue its upward movement until it has reached the end of its upward stroke and on its return a pin 32 on the plate 14 will strike the upper edge of the segment gear 11 to return the segment gear to its normal position and the cut 15 is at the same time brought into alinement with the rear end of the plate 12. As the segment gear begins to move downward the lower edge of the notch 30 will cam the plate 12 back into engagement with the notch 15 in the locking plate 14. Just before the segment gear reaches the lower end of its stroke, the key pressed in is released as above described and the detent plate 19 is returned to its normal position. This, through the action of the stud 23 in the slot of the arm 24, carries the arm 24 to its normal position as shown in Fig. 1. The upper extension 102 of the bell crank lever 34 will be in the path of the stud 28, stopping the segment, and the inner edge 42 of the arm 24 acting against the pin 29 will cam the plate 12 out of engagement with the cut 15 in the locking plate 14 and into engagement with the lowest notch 30 in the locking detent plate. The mechanism will be then ready for the next operation.

An indicator 59 is positioned by an actuator 43 having teeth 57 in engagement with an indicator pinion 58. The indicator actuator 43 and the segment gear 11 are connected by links 44 and 45 swinging loosely from rivets 46 and 47 in the indicator actuator and registering segment respectively. Through these links the position that the indicator actuator is to take is established, but the actuator is not always positively placed by them, as the link 44 swings loose under the shaft 3. After the segment 11 is stopped by one of the keys as above described, the indicator actuator is positively positioned by one of a series of arms 48 fastened to a rock shaft 49. This shaft has attached to it a rearwardly extending arm 50. A pitman 51, reciprocated by a cam 52 fast on the shaft 2, acts normally against the roll and stud 53 on the arm 50, rocking the shaft 49. The downward movement of the pitman 51 throws the arm 48 up so that the roll 54, which is held by a stud 55 in the arm 48 strikes the under side of the link 44 and moves it up until the semi-circular cut 56 in the link rests securely against the under side of the hub of the segment gear 11. The travel of the rear end of the link 44 pushes the link 45 up, rotating the indicator actuator 43 and, through the gear teeth 57 and the pinion 58, placing the indicator 59 in the correct position to indicate the value represented by the key pressed in or the position in which the segment gear 11 is resting.

To aline the indicator actuators and indicators, there are provided indicator alining devices 61, one for each indicator actuator, fastened to a shaft 60 extending across the machine. The shaft is given a rocking movement, first clockwise and then anti-clockwise, by a pitman 63, which is reciprocated by a cam 67 Fig. 2, acting on an arm 62 also secured to the shaft 60. This rocking movement of the shaft moves the points of the alining devices first out of engagement with the notches 68 of the indicator actuators and then, after the actuators have been positioned, back into engagement so as to hold the actuators and the indicators 59 in their correct positions.

As stated in the foregoing, the invention embodies means for resetting the totalizer to zero by operating the machine in a certain manner. For reasons that will be shown later on, it is necessary during this resetting operation to disable the indicator positioning means just described. The pitman 51 has an L shaped slot in its lower end in which the roll and stud on the arm 50 operates. Ordinarily the roll and stud operates in the shorter side 69 of the slot as shown in Fig. 1 and the indicator positioning arms 48 are operated each time the machine is operated. When it is desired to prevent the movement of the indicator positioning arms, the pitman 51 is swung back so that the long side 70 of the slot is in the path of the roll and stud 53. Then as the pitman 51 is reciprocated by the cam 52 the roll and stud 53 will not be engaged, but the pitman will simply move idly down and up, and the indicator positioning arms 48 will not be moved. The pitman 51 is swung back when it is desired to have it move idly, by turning the key in a lock 90 (Fig. 6). The flange of the lock barrel has in it a pin 91 which passes through a slot 104 in the upper arm of a bell crank lever 88 which is pivoted on the shaft 49. In the upper end of the bell crank lever is a stud 87 extending through an elongated slot 89 in the pitman 51. When the lock 90 is turned clockwise the pin 91 in the lock will rock the bell crank lever on its pivot and the pin 87 will swing the pitman 51 back so that the long side 70 of the L shaped slot will be in the path of the roll and stud 53.

The totalizer resetting mechanism will next be described, because the construction of this mechanism is such that the totalizer is given certain movements during the resetting operation that must be understood before the printing, adding and transferring mechanism can be understood. The totalizer comprises a plurality of wheels 71 revolving on a shaft 72 which is supported at either end by one of two arms 150 fastened to a rock shaft 107. Each of the totalizer wheels has attached to its side a turn back pawl 73 (Fig. 9) adapted to engage a notch 80 in the shaft 72. During adding operations the totalizer wheels turn in the same direction as the pawls 73 are pointed. For reasons that will appear later, the shaft 72 must be at the zero position when the resetting operation is started and in order to prevent the pawls 73 from displacing the shaft during adding operations the notches 80 are normally out of alinement with the pawls, but means are provided for shifting the shaft 72 lengthwise independently of the totalizing elements loosely mounted upon it. This shift occurs at the beginning of the resetting operation. The mechanism for shifting the shaft comprises pins 151 and 153 (Fig. 10) on the shaft and the cam disks 155 and 154 with which the pins mentioned are respectively in contact and which disks are fastened to the totalizer supporting arms 150. The normal position of these parts is as shown in the drawing, that is, the pin 151 rests in the notch of the cam 155 and the pin 153 is at the apex of the cam 154. During the resetting operation the shaft 72 is turned anti-clockwise (Figs. 8 and 9) and the pin 151 in the shaft engages one side of the notch in the cam disk 155, camming the shaft to the left without moving the totalizer wheels. This brings the notches 80 into alinement with the pawls 73 so that the square ends of the pawls can engage the square sides of the notches. In resetting, the shaft 72 is rotated in the opposite direction from that in which the wheels were carried in adding operations and the notches 80 engage the ends of the pawls 73 and carry the wheels 71 back to the zero position where they will be stopped by pins 106 on the totalizer wheels coming in contact with the hooks on the upper end of arms 105 (Fig. 8) which are rigidly held by the shafts 60 and 107. Just before the resetting rotation of the shaft 72 is completed, however, the pin 153 on the right end of the shaft will be engaged by the surface 156 of the cam disk 154, shifting the shaft 72 back to the normal position and carrying the notches 80 out of engagement with the turn back pawls 73. The notches 80 are beveled at one side, as shown in Fig. 10, so that when the shaft is shifted back to the normal position these bevels will cam the pawls up out of the notches and upon the circumference of the shaft against which they rest during the adding operations.

The mechanism by which the shaft 72 is rotated is shown in Fig. 9. Attached to the left end of the shaft 72 is a broad toothed pinion 74 which is driven by a segment gear 75 pivoted on the shaft 1. The segment gear has a pitman 76 loosely connected to it by a rivet 77 and this pitman is actuated by a cam 79. As the cam is revolved by the shaft 2 to which it is fastened, the pitman 76 is carried forward, moving the segment gear 75 first in a clockwise and then in an anti-clockwise direction about the shaft 1. This clockwise movement drives the pinion 74 and the shaft 72 in an anti-clockwise direction and carries the totalizer wheels to zero. Just before the segment gear 75 is returned to the normal position, the totalizer is rocked down, as will be hereinafter described, disengaging the gear from the segment gear and leaving the segment gear free to return to normal position without affecting the totalizer. It is, of course, apparent that the endwise movement imparted to the shaft 72 by the cam 55 at the beginning of the rotation of the shaft is not great enough to disengage the broad pinion 74 from the resetting segment 75. As will be understood by referring to Fig. 10, only a slight movement is necessary to bring the notches 80 in the shaft 72 under the pawls 73.

Figure 7:
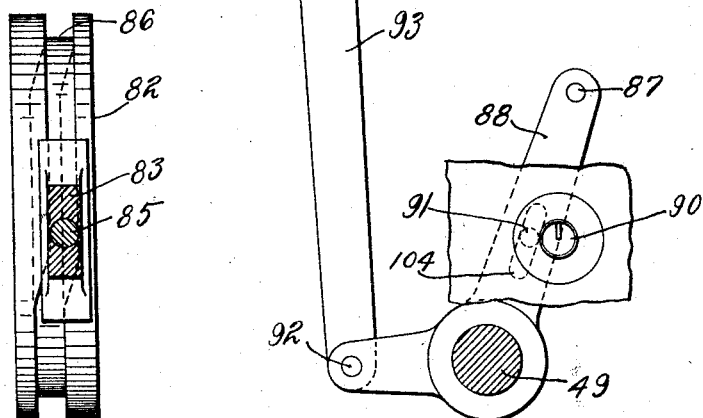
Fig. 7 is a detail of the cam for shifting the totalizer laterally of the machine.

The resetting segment gear 75 and pinion 74 are normally in engagement and, as the segment gear operates each time the machine is operated, on an adding operation, it is necessary to disengage them and hold them out of engagement. For this reason the shaft 107 which carries the totalizer frame is so mounted in its bearings in the machine frames that the totalizer can be bodily shifted back and forth laterally of the machine. This shifting is accomplished by a cam 82 (Figs. 6 and 7), which is fastened to and rotated by the shaft 2, working in connection with an arm 83 attached to the totalizer frame. The rear end of the arm has a curved surface 84 shaped to fit the periphery of the cam 82. In the end of the arm is a plunger 85 which engages a race 86 in the edge of the cam. As the cam is revolved in a clockwise direction by the shaft 2, the race of the cam acting against the plunger 85 will shift the totalizer to the left, thereby moving the resetting pinion 74 out of engagement with the resetting segment 75. When it is desired to reset the totalizer all that is necessary is to withdraw the plunger 85 from the cam race 86 thereby leaving the totalizer in its normal position with the resetting pinion 74 and the resetting segment 75 in engagement.

The plunger is disengaged in the following manner:—Fastened in the plunger 85 is a stud 97 passing through a slot 98, indicated by dotted lines, in the shifting arm 83. The bell crank lever 88 has loosely attached to it by a rivet 92, a pitman 93 having a guide slot 94 encompassing the shaft 60. In the upper end of the pitman is a cam slot 96 engaging the stud 97 in the plunger 85. When the bell crank lever 88 is rocked clockwise on its pivot 49 by the operation of the lock 90 as above described, the pitman 93 is carried up. This causes the lower edge of the cam slot 96 acting against the stud 97, to draw its plunger 85 out of engagement with the cam race 86 and prevent the lateral shifting of the totalizer. In other words, the totalizer is left in its normal position. The pitman 93 has an extension 99 formed on it extending at right angles to and under the arm 83. In the upper edge of this extension is a cut 101 which engages the under side of the arm 83 when the plunger is withdrawn from the cam race 86, and supports the arm in the proper position for the plunger to engage in the cam race when the plunger is driven rearward by turning the lock 90 back to its normal position.

This shifting and means for preventing the shifting also makes it possible to print the total under the positive control of the totalizer. Attached to each totalizer element is a pinion 110 normally in engagement with the indicator actuator 43 and the indicator actuator is always in mesh with the indicator pinion 58. Attached to each indicator actuator is one of the sleeves 190 bearing on the other end one of the type carriers 1101 (Fig. 13). On an adding operation when the totalizer is shifted to disengage the totalizer resetting gear 74 from the resetting segment gear 75, the pinion 110 is also carried out of engagement with and into a different plane from the indicator actuator 43 so that the indicator actuator is not affected, but when the lock 90 is operated and the plunger 85 is withdrawn from the cam, the totalizer is left with the gears 110 in engagement with the indicator actuators 43. Then when the shaft 72 is revolved in the resetting operation the indicator actuator 43 must necessarily be rotated a distance corresponding to the distance the totalizer wheel is rotated. The distance that the totalizer wheel rotates will, of course, depend upon the distance that it has been carried from the zero position by the adding operations. For instance, if a totalizer wheel shows "5" it may be said to be five divisions away from the zero position. In turning back to zero the totalizer wheel will be carried five divisions, moving the indicator actuator, the indicator and the type carrier corresponding distances. In the example just mentioned the indicator and type carrier will be positioned to indicate and print "5".

There was described above a device for positioning the indicators and means for disabling the positioning device. The purpose of this disabling device is to prevent the indicator positioning mechanism from interfering with the positioning of the indicators by the totalizer. When it is desired to reset the totalizer to zero and print the total, the machine must first be given a blank operation, that is, one in which no registering keys are used. This will place all of the segment gears, indicators and type carriers at the zero position. Then when the lock 90 is operated, the indicator positioning device is put out of commission at the same time that the totalizer shifting device is disconnected, leaving the indicator actuators free to be moved under control of the totalizer without the interference of the indicator positioning mechanism.

The totalizer elements are operated to register amounts by actuators 112, which are driven by the segment gears 11. As will be seen by Fig. 1, each totalizer gear 117 and its actuator 112 are normally out of engagement. They are also normally in different planes, (Fig. 10). The totalizer frame has a rearwardly extending arm 113 (Fig. 6) with a stud 114 in it to hold an anti-friction roll 115 operating in a race 116 of a cam 82 fastened to the shaft 2. This cam race is deep enough and the roll and stud are long enough to prevent their being disconnected when the arm 113 is carried away from the cam 82 by the lateral shifting of the totalizer as described in the foregoing. As the cam 82 is revolved by the shaft, the totalizer is rocked with shaft 107 for a pivot first down and then up into the position shown in Fig. 6. Just previous to the downward movement of the totalizer it is shifted over by the shifting mechanism described above, bringing each totalizer gear 117 into the same plane as its totalizer actuator 112. Immediately after the totalizer is drawn down into engagement with the actuators 112 the registering segments 11 are carried up the proper distances to represent the value of the keys pressed in and as the actuators 112 and the registering segments 11 are always in engagement, the totalizer wheels are of course given corresponding units of movement. Before the segments start their down stroke the totalizer is shifted laterally, disengaging the totalizer gears from the actuators 112 and it is then rocked up to the normal position with the gears 110 in engagement with the actuators 43.

As indicated in the description given above of the resetting mechanism, the resetting shaft 72 must not be allowed to move away from the zero position except during resetting operations. Means are provided for preventing the shaft from working out of position during these shifting movements of the totalizer. Two pins 157 and 158 (Fig. 10) are set in the machine frame 159 in such positions that when the totalizer is shifted to the left the pin 157 engages the teeth of the resetting gear 74 and prevents any rotation of the gear and shaft. On the downward movement of the totalizer the gear 74 is brought into engagement with the pin 158 and this pin is long enough for the gear to remain in engagement with it while the totalizer shifts to the right. When the totalizer is rocked back to its original position the gear 74 is carried clear of the pin 158, leaving the gear free to be rotated.

Figure 11:
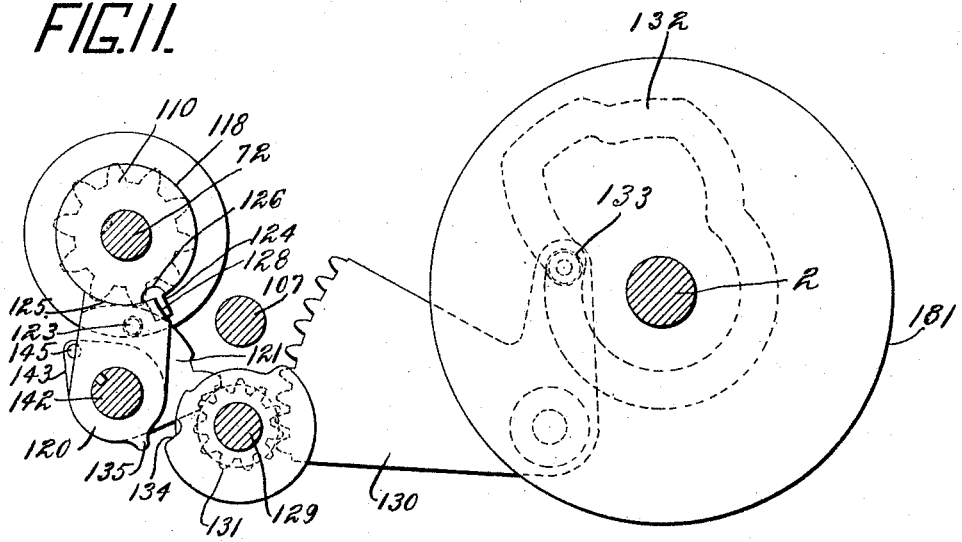
Fig. 11 is a detail of the transfer operating mechanism.

The lateral shifting and the vertical rocking of the totalizer have been utilized in devising the mechanism for transferring from totalizer wheels of lower to wheels of higher values. Two of the sections of the totalizer with their corresponding transfer elements are shown in Fig. 10. Each totalizer element consists of the gear 110 to engage the indicator actuator 43, the totalizer wheel 71, the operating gear 117 which is to engage the totalizer actuator 112 and a transfer trip cam 118. All of these members are rigidly fastened together and loosely mounted on the shaft 72 with spacing collars 119 to hold the different sets of these members the proper distance apart on the shaft. Each transfer element consists of a transfer tripping plate 120 and a transfer operating plate 121, the two being rigidly fastened together on a sleeve 122 and rotatable on the shaft 142. In order to understand the operation of this mechanism it is necessary to recall the movements of the totalizer. The totalizer is first shifted to the left so as to bring the operating gear 117 into the same plane as the actuator 112. The totalizer is then rocked down bringing this gear and the actuator into engagement, then shifted to the right, disengaging the gear 117 from the actuator 112, after which the totalizer is rocked back up to the normal position shown in Fig. 10. When the totalizer is shifted to the left and rocked down, the periphery of the trip cam 118 will rest in the curved upper edge 125 of the transfer trip plate and a stud 123 will be in the path of an extension 124 on the trip cam 118. When an amount is registered carrying the totalizer wheel past the "9" position, the extension 124 of the trip cam will strike the stud 123 and carry it forward. The trip cam has in it a groove 126 to receive the point 127 of the trip plate and allow the plate to rotate on its shaft. As the forward movement of the plate is continued it will be drawn into the position shown in Fig. 12 with the curve 128 riding against the periphery of the transfer trip cam 118 locking the plate in that position, while the transfer operating plate 121 is drawn up and held in the position shown in Fig. 12. The transfer trip cam 118 is wide enough to hold the transfer trip plate 120 in tripped position when the totalizer is shifted to the right (Fig. 10), as previously described, to bring the gears 110 in vertical alinement with the transfer operating plates 121. Mounted on a shaft 129 extending the length of the totalizer are a number of transfer cams fastened to the shaft. This shaft is rotated first clockwise and then anti-clockwise by a segment gear 130 (Figs. 8 and 11) driving a pinion 131 attached to the transfer cam shaft. This segment gear 130 is driven by a cam 181 which has a cam race 132 working against a stud and roll 133 fastened to the upper extension of the segment gear. When the shaft 129 is rotated clockwise, the extension 134 on the transfer cam will strike against the lug 135 on the transfer trip plate. This will carry the tooth 136 on the transfer operating plate 121 up into engagement with the transfer wheel 110 and carry the totalizer wheel forward one division. The totalizer is then rocked up out of engagement with the transfer members so that the latter can be returned to their normal position by the transfer restoring mechanism.

Figure 12:
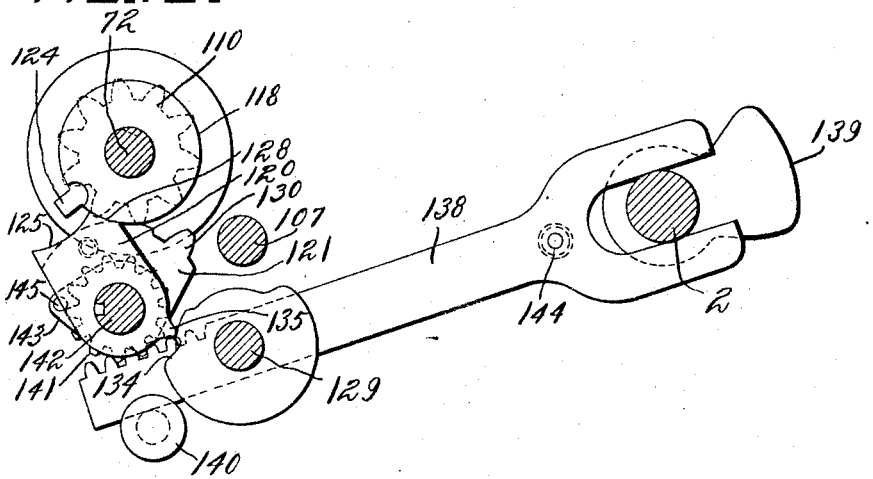
Fig. 12 is a detail of the transfer restoring mechanism.

The transfer restoring mechanism is shown to the best advantage in Fig. 12. It comprises a rack 138 which is actuated in one direction, by a cam 139 fastened to the main driving shaft 2. The lower end of the rack is supported and guided by a roll 140 and the other end by a fork which spans the shaft 2. The teeth of the rack are in engagement at all times with a pinion 141 securely fastened to shaft 142. Fastened to the same shaft are transfer restoring plates 143. Any movement which is given the shaft 142 by the rack 138 is therefore transmitted to the plates 143. When the machine is first operated the cam 139 is rotated out of the path of a roll and stud 144 fastened to the rack 138, allowing the rack to move freely and preventing it from interfering with the movements of the transfer operating mechanism. After the transfer has been made the cam 139 strikes the roll and stud 144 pushing the rack 138 forward and rocks the shaft 142 and the transfer restoring plates 143 in a clockwise direction. A pin 145 in the transfer restoring plate will strike the forward edge of the transfer operating plate 121 and carry it and the transfer trip plate 120 back to their normal position. This description shows that the entire transfer mechanism is positive throughout, there not being a spring used throughout this part of the mechanism, and the number of parts has been reduced to a minimum.

So far in the description no mention has been made of the construction and operation of the printer. In fact, none is necessary. While Fig. 13 shows the printer constructed on the Cleal & Reinhard principle, it is illustrative only. The inventive idea concerns itself with the positioning of the type carriers, and the means for taking the impression from the type, feeding the record strip, etc., are not involved in the improvement.

In summarizing briefly the operation of the illustrative machine and the various improvements embodied in it, a description will first be given of what happens on a regular adding operation. One of the keys 16 is first pressed in after which the machine can be operated by any suitable means, transmitting the power to the main shafts of the machine. Pressing in the key operates a plunger or sliding plate 12 that positively connects the differential mechanism with the positively operating main mechanism. The differentially moved segment gear 11 is carried up until the latch is drawn forward by one of the registering keys, thereby disconnecting the segment gears and differentially moved mechanism from the main driving mechanism. This upward movement of the segment gear determines the position for the indicator actuators, the type carriers attached to the indicator actuators and the indicators. These parts are then moved into the determined positions by arms 48 moving the links connecting the segment gears 11 and the indicator actuators 43. Indicator alining devices, which were drawn out of engagement when the machine started to operate are then brought up into engagement with the indicator actuators, holding the actuators, indicators and type carriers rigidly in position to indicate the value of the key just pressed. The segment 11 is returned by a pin 32 in the locking plate 14, rigidly attached to the shaft 3, acting in connection with the latch plate 12 which is forced back into engagement with the locking plate 14 as soon as the pin just mentioned contacts the segment gear 11. The key pressed in is released by the key releasing mechanism in time to position the arm 24 to disconnect the latch plate 12 from the locking plate 14 when the segment gear 11 reaches its normal position. The totalizer during this time is shifted first to the left to disconnect the resetting mechanism, and the totalizer driving gears and the totalizer actuators, which are normally in different planes, are brought into alinement. The totalizer is then rocked forward and down so that the totalizer operating gears are brought into engagement with the totalizer actuators. The actuators 112 are always in mesh with the segment gears 11. Just after the totalizer operating gears are meshed with the actuators, the registering segments 11 begin their upward travel, driving the totalizer wheels the proper number of divisions to represent the value of the keys pressed in. It is at this time that the transfer elements are tripped, if there is a transfer to be made from one totalizer wheel to the wheel of next higher value. The totalizer is then shifted to the right bringing the transfer operating plates into alinement with the transfer gears 110 and the transfer operating mechanism then completes the transfer. The totalizer is then rocked back up to normal position and the transfer mechanism is restored to its normal position by the restoring mechanism provided.

When it is desired to reset the totalizer to zero and print the total it is necessary to first make a blank registration. This is to bring the indicators and type wheels to their zero positions. The lock 90 is then operated, shifting the pitman 51 so that the devices for positioning the indicators will not be moved during the resetting operation. Operating the lock 90 also disconnects the totalizer shifting mechanism so that the totalizer will remain in its normal position, that is, in engagement with the indicator actuators. The resetting mechanism revolves the shaft 72 on which the totalizer wheels are mounted and this shaft 72 is cammed laterally at the beginning of the rotation to bring the resetting notches 80 first into alinement and then into engagement with the ends of spring pressed pawls 73 attached to the wheels. Continued rotation of the shaft carries the wheels back to zero and cams the shaft 72 back to its normal position. The distance that each totalizer wheel is turned during the resetting operation depends entirely on the distance it has been carried away from the zero position by the adding operation. The backward rotation of the totalizer wheels is transmitted through the indicator actuators 43 to the type carriers and indicators, causing them to be carried away from their zero positions the same number of divisions that the corresponding totalizer wheels are rotated in returning them to their zero position. In other words, the amount shown by the totalizer wheels is transferred, as the totalizer is carried to zero, to the indicators and the type carriers. After the type carriers are positioned the printer operating mechanism takes an impression from them on the record strip.

While the form of mechanism herein shown and described is admirably adapted to fulfil the objects primarily stated, it is to be understood that it is not intended to confine the invention to the one form of embodiment shown and described herein, as it is susceptible of embodiment in various forms, all coming within the scope of the claims which follow.

What is claimed is:—

1. In a machine of the class described, the combination with a main operating mechanism having manipulative value determining keys; of a member to be differentially moved under control of said value determining keys and returned to zero position on the same operation; means whereby said differentially moved member is positively connected with the main operating mechanism when one of the value determining keys is pressed in; and means whereby the differentially moved member is positively disconnected from the main operating mechanism by the value determining keys.

2. In a machine of the class described, the combination with a main operating mechanism having rows of value determining keys; of gear segments to be differentially moved under control of said keys and returned to their zero positions on the same operation; means whereby said gear segments are positively connected with the main operating mechanism when value determining keys are pressed in; and means whereby the segment gears are positively disconnected from the main operating mechanism by the value determining keys.

3. In a machine of the class described, the combination with a main driving mechanism and rows of amount determining keys, of segment gears to be differentially moved by the main driving mechanism under control of said keys and returned to normal position at each operation, latches appropriate to the gears for positively connecting the segment gears with the driving mechanism and arms appropriate to the latches each having two camming edges one of which coöperates with its appropriate latch when any of the amount determining keys are pressed in to connect its gear to the operating mechanism, the other edge serving to disconnect the latch upon return of the gear to normal position.

4. In a machine of the class described, the combination with a main driving mechanism and amount determining keys, of a segment gear designed to be differentially moved by the main driving mechanism under control of the keys, a sliding plate actuated by said keys, elements operated by the sliding plate to positively connect the segment gear with said driving mechanism when any of the amount determining keys are pressed in and cam edges on the keys for positively operating said elements to disconnect the segment gear from the driving mechanism.

5. In a machine of the class described, the combination with a main driving mechanism and value determining keys, of a segment gear to be differentially moved by the main driving mechanism under control of the value determining keys, a sliding plate actuated by said keys, an arm operated by the sliding plate in such a manner as to positively connect the aforesaid segment gear with the main driving mechanism when one of the value determining keys is pressed and cam edges on the keys for disconnecting the segment gear from the driving mechanism.

6. In a machine of the class described, the combination with a main operating mechanism and amount determining keys, of a member to be moved differentially under the control of said keys, means for positively connecting said member with the main operating mechanism when one of the keys is pressed in, and an extension on each key arranged to disconnect said member from the main operating mechanism when it is brought into contact with the key.

7. In a machine of the class described, the combination with a main operating mechanism and amount determining keys, of a member to be moved differentially by the operating mechanism under control of the keys and returned to normal position at each operation, a bell crank lever, an arm, and a sliding plate actuated by the said amount determining keys to operate the arm in connection with the bell crank lever in such a way as to positively connect the differentially moved member with the main operating mechanism and disconnect the same upon return of the member to normal position.

8. In a machine of the class described, the combination with totalizer actuators; of a totalizer having gears to engage said actuators, the totalizer gears being normally out of engagement with and in different planes from their actuators, an arm for normally shifting the totalizer laterally of the machine, an arm to oscillate the totalizer vertically, and a cam to operate both of said arms.

9. In a machine of the class described, the combination with totalizer actuators; of a totalizer comprising gears to engage said actuators, the gears being normally out of engagement with and in different planes from said actuators; normally effective means for bodily shifting the totalizer laterally of the machine to bring the totalizer gears and their actuators in the same plane; and means for disabling said shifting means.

10. In a machine of the class described, the combination with totalizer actuators; of a totalizer comprising gears to engage said actuators, the gears being normally in different planes from the actuators, an arm and a cam for bodily shifting the totalizer laterally of the machine to bring the totalizer gears and their actuators in the same plane, a plunger connecting the arm with the cam, and means for withdrawing the plunger from the cam thereby disconnecting the arm from the cam and preventing the shifting of the totalizer.

11. In a machine of the class described, the combination with totalizer actuators, of a totalizer comprising gears to engage said actuators, the gears being normally in different planes from the actuators, an arm and a cam for bodily shifting the totalizer laterally of the machine to bring the totalizer gears and their actuators in the same plane, a plunger connecting the arm with the cam, and devices operated by a lock to withdraw said plunger and disconnect the arm from the cam so they cannot shift the totalizer.

12. In a machine of the class described, the combination with totalizer actuators; of a totalizer comprising gears to engage said actuators, the gears being normally in different planes from the actuators; an arm and a cam for bodily shifting the totalizer laterally of the machine to bring the totalizer gears and their actuators in the same plane, means normally connecting the arm with the cam, and manipulative means for disabling said connecting means so the totalizer will not be shifted.

13. In a machine of the class described, the combination with a totalizer comprising a plurality of totalizer wheels each having attached to it a turn back pawl, of a shaft supporting said totalizer wheels and having in it notches arranged to engage said turn back pawls when the shaft is rotated in one direction, a gear attached to said shaft, a segment gear normally in engagement with said gear, a cam and connecting parts to operate the segment gear and the gear to rotate the shaft and carry the totalizer wheels to zero, and means for bodily shifting the totalizer laterally of the machine on an ordinary adding operation so as to disengage said gear and segment gear to prevent the totalizer being turned to zero.

14. In a machine of the class described, the combination with a totalizer comprising a plurality of totalizer wheels each having attached to it a turn back pawl, of a shaft supporting said totalizer wheels and having in it notches arranged to engage said turn back pawls when the shaft is rotated in one direction, a segment gear, a gear attached to the totalizer shaft and normally in engagement with the segment gear, means for bodily shifting the totalizer laterally of the machine on adding operations thereby disengaging said segment and gear, and means for disabling said shifting means when it is desired to turn the totalizer to zero.

15. In a machine of the class described, the combination with a totalizer, of means for automatically resetting the totalizer to zero, said totalizer and resetting means being normally in engagement, means normally disengaging the totalizer from the resetting means when the machine is operated in the usual manner; and manipulative means for disabling said disengaging means when it is desired to reset the totalizer to zero.

16. In a machine of the class described, the combination with a totalizer; of means for automatically resetting the totalizer to zero, said totalizer and its resetting means being normally in engagement, means normally disengaging the totalizer from the resetting means when the machine is operated for addition, and devices operated by a lock to disable said disengaging means when it is desired to reset the totalizer to zero.

17. In a machine of the class described, the combination with a totalizer comprising a plurality of totalizer elements having transfer tripping means, of transfer devices comprising sets of two rigidly connected transfer elements arranged to be tripped by said transfer tripping means, a series of helically positioned devices for operating said transfer sets, and means for bodily shifting the totalizer laterally of the machine between the tripping of the transfer devices and their operation by the helically positioned devices.

18. In a machine of the class described, the combination with a totalizer comprising a plurality of totalizer members having transfer tripping means and transfer gears, of transfer devices comprising sets of two rigidly connected transfer elements, one of the elements to be engaged by the transfer tripping means and the other to engage a transfer gear, and operate it; and means for shifting the totalizer laterally of the machine to move the transfer operating element in and out of engagement with its transfer gear.

19. In a machine of the class described, the combination with a totalizer comprising a plurality of totalizer members, of transfer devices comprising sets of two rigidly connected transfer elements, means for tripping the transfer devices, means for positively locking the transfer devices in a tripped position, means for shifting the totalizer laterally to move the transfer devices in and out of engagement with the totalizer members, means for positively actuating the transfer devices to move the totalizer members, and means for positively restoring the transfer devices to their normal positions.

20. In a machine of the class described, the combination with a main operating mechanism having value determining keys, of a member to be differentially positioned by the main operating mechanism under control of said keys, an indicator actuator, link connections between the actuator and said member, means operating said link connections to position said indicator actuator to correspond to the various positions of the differentially moved member, and manipulative means for disabling said indicator actuator positioning means.

21. In a machine of the class described, the combination with a main operating mechanism having value determining keys, of a member to be differentially positioned by the main operating mechanism under control of said keys, an indicator actuator, means for positioning said indicator actuator to correspond to the various positions of the differentially moved member, and mechanism controlled by a lock to disable said indicator actuator positioning means.

22. In a machine of the class described, the combination with a main operating mechanism having value determining keys, of a member to be differentially positioned by the main operating mechanism under control of said keys, an indicator actuator, means for positioning said indicator actuator with reference to the various positions of the differentially moved member, a lever and a lock controlling same to disable said indicator positioning means.

23. In a machine of the class described, the combination with a main operating mechanism having manipulative value determining keys, of elements to be differentially moved by the main operating mechanism under control of said keys, indicator actuators having links connecting them loosely with the differentially moved elements, a revoluble cam, a pitman, pivotally mounted arms given an invariable movement through connecting means by said cam and pitman to positively operate the indicator actuator links and position the indicator actuators in correct relation to the various positions of the differentially moved elements, and means controlled by a lock for disabling the pitman when desired.

24. In a machine of the class described, the combination with a main operating mechanism having manipulative value determining keys, of elements to be differentially moved by the main operating mechanism under control of said keys, indicator actuators having links connecting them loosely with the differentially moved elements, a revoluble cam, a pitman, pivotally mounted arms given an invariable movement through connecting means by said cam and pitman to positively operate the indicator actuator links and position the indicator actuators in correct relation to the various positions of the differentially moved elements, and manipulative means for disconnecting the cam and pitman when desired.

25. In a machine of the class described, the combination with a main operating mechanism, of a totalizer, actuators therefor, type carriers with independent means positioning them to print amounts added on the totalizer by its actuators, means for disabling said positioning means, means for turning the totalizer back to zero by operation of the main operating mechanism, and means whereby turning the totalizer to zero will positively position the type carriers to print the total shown on the totalizer.

26. In a machine of the class described, the combination with an operating mechanism of value determining keys, a totalizer, type carriers, means for positioning said type carriers with reference to the keys used, and means for disabling said positioning means and transferring control of the type carriers to the totalizer, whereby the type carriers are adjusted by an operation of the operating mechanism under the control of the totalizer.

27. In a machine of the class described, the combination with an operating mechanism of value determining keys, type carriers, means for adjusting the same to print values under control of the keys, a totalizer, and means independent of said first means for positioning the type carriers upon an operation of the operating mechanism and under control of the totalizer when it is desired to print the total shown on the totalizer.

28. In a machine of the class described, the combination with a main operating mechanism having value determining keys, of a totalizer, indicators to indicate items registered in the machine by the use of the keys, type carriers arranged to print said items, and means actuated by the totalizer for positively transferring amounts shown on the totalizer to the indicators and type carriers.

29. In a machine of the class described, the combination with a main operating mechanism, of value determining keys, type carriers positioned under control of said keys, means for disabling said control, a totalizer, totalizer actuators, and means independent of the totalizer actuators for positively positioning the type carriers by an operation of the main operating mechanism and under control of the totalizer when said key control has been disabled.

30. In a machine of the class described, the combination with a main operating mechanism, of a plurality of value determining keys, a single set of type carriers controlled by said keys for listing items registered by the use of the keys, a totalizer, actuators therefor, and means whereby the type carriers can be brought under the positive control of the totalizer and operated by means independent of the totalizer actuators and during operations of the main operating mechanism when it is desired to print the total shown by the totalizer.

31. In a machine of the class described, the combination with a main operating mechanism, of value determining keys, a totalizer, actuators therefor, type carriers normally positioned under positive control of the value determining keys, mechanism for transferring said positive control over the type carriers from the amount determining keys to the totalizer, and means independent of the totalizer actuators for turning the totalizer back to zero on an operation of the main operating mechanism.

32. In a machine of the class described, the combination with an operating mechanism having manipulative value determining devices, of indicators to indicate amounts registered in the machine by the value determining devices, type carriers for listing items as they are registered in the machine, a totalizer, totalizer actuators, a totalizer resetting mechanism comprising an independent actuator, and means whereby actuation of the totalizer resetting actuator will positively transfer the total shown on the totalizer to the indicators and type carriers.

33. In a machine of the class described, the combination with an operating mechanism having manipulative value determining devices, of type carriers and indicators, means for positively positioning said type carriers and indicators under control of the value determining devices, and means for disabling said positioning means and transferring positive control of the type carriers and indicators to the totalizer.

34. In a machine of the class described, the combination with an operating mechanism, of manipulative value determining devices, a totalizer, actuators to register on said totalizer amounts determined by the manipulation of the value determining devices, type carriers, totalizer resetting mechanism comprising an independent actuator driven by the operating mechanism, and means whereby the actuation of the resetting actuator will positively position the type carriers to print the total shown on the totalizer.

35. In a machine of the class described, the combination with a main driving mechanism having manipulative value determining devices, of elements differentially positioned by the main driving mechanism under control of said value determining devices and returned to normal position at each operation of the machine, and means whereby proper manipulation of the value determining devices will positively connect the differentially positioned element with the driving mechanism when any of the amount determining devices are operated, said means being employed positively to disconnect the elements from the driving mechanism on restoration of the elements to normal position.

36. In a machine of the class described, the combination with an indicator, of an indicator actuator therefor, a totalizer comprising a gear normally in engagement with said indicator actuator, means for disengaging said totalizer and said indicator actuator, and means for disabling said disengaging means.

37. In a machine of the class described, the combination with indicators, of indicator actuators therefor, a totalizer comprising gears normally in engagement with said indicator actuators, means for disengaging said totalizer and said indicator actuators, means for disabling said disengaging means, and means for turning said totalizer gears to zero and thereby actuating said indicator actuators to transfer the total on the totalizer to the indicators when said disengaging means is disabled.

38. In a machine of the class described, the combination with indicators, of actuators therefor, a totalizer comprising gears normally engaging said indicator actuators, an arm and a cam for normally disengaging said totalizer and said indicator actuators, a plunger connecting the cam with the arm and means for withdrawing the plunger from the cam to prevent the disengagement of the gears from the indicator actuators.

39. In a machine of the class described, the combination with indicators, of actuators therefor, a totalizer comprising gears normally engaging said indicator actuators, an arm and a cam for normally disengaging said totalizer and said indicator actuators, a plunger connecting the cam with the arm, means for withdrawing the plunger from the cam to prevent the disengagement of the gears from the indicator actuators, and means for turning the totalizer to zero when the plunger is withdrawn whereby the indicator actuators are actuated to transfer the total on the totalizer to the indicators.

40. In a machine of the class described, the combination with indicators, of actuators therefor, means for differentially positioning said actuators, a totalizer including gears normally in engagement with said indicator actuators, totalizer actuators normally out of operative relation with the totalizer, means for moving the totalizer gears out of engagement with the indicator actuators, means for disabling said moving means and said indicator actuators positioning means, and means for turning said totalizer to zero when said moving means and said positioning means are disabled to transfer the total on the totalizer to the indicators.

41. In a machine of the class described, the combination with a main operating mechanism, of indicator actuators therefor, means for positioning said actuators by an operation of the machine, a totalizer including gears normally in engagement with said actuators, totalizer actuators normally out of operative relation with the totalizer, means for moving the gears of the totalizer out of engagement with the indicator actuators and moving the totalizer into operative relation with the totalizer actuators, means for disabling said moving means and said indicator actuator positioning means, and means operated by the operating mechanism for turning said totalizer to zero when said moving and positioning means are disabled to transfer the total on the totalizer to the indicators.

42. In a machine of the class described, the combination with a driving mechanism, of a series of keys, a differentially movable member, a normally ineffective plunger for connecting the differentially movable member and the driving mechanism, means whereby operation of a key will positively move the plunger to effective position, and means carried by each key for positively moving the plunger to ineffective position, whereby to disconnect the differential member from the driving mechanism.

43. In a machine of the class described, the combination with a driving mechanism, of depressible keys, differentially movable members, plungers carried by said members, connections whereby depression of keys will positively actuate the plungers to connect the differential members and the driving mechanism, and means carried by the keys for positively operating the plungers to disconnect the differential members from the driving mechanism.

44. In a machine of the class described, the combination with a driving mechanism, of a series of keys, a differentially movable member, a device movable to connect and disconnect said member and the operating mechanism, means whereby operation of a key will positively move said device in one direction to connect the differential member and the operating mechanism, and means carried by the keys for positively moving the device in the opposite direction to disconnect the differential member from the operating mechanism.

45. In a machine of the class described, the combination with totalizer elements, of transfer tripping projections thereon, a transfer device comprising two members rigid together, one to coöperate with a tripping projection and the other to coöperate with but normally out of operative relationship with the higher order totalizer element, invariably moved devices for operating tripped transfers, and means for shifting the totalizer laterally to establish operative relationship between the higher order element and the transfer device before the transfer device is operated.

46. In a machine of the class described, the combination with totalizer elements, of transfer tripping projections carried thereby, of a transfer device comprising two members rigid together, one to coöperate with a tripping projection and the other to coöperate with but normally out of operative relationship with the next higher order totalizer element, invariably moved devices for giving tripped transfer devices an additional movement in the same direction as when tripped, and means for shifting the totalizer laterally to establish operative relationship between the higher order element and the transfer device preliminary to said additional movement.

47. In a machine of the class described, the combination with totalizer elements, of transfer tripping projections thereon, a transfer device comprising two members rigid together, one to coöperate with a tripping projection and the other to coöperate with but normally out of operative relationship with the next higher order totalizer element, means for operating tripped devices to turn in transfers, means for shifting the totalizer laterally to establish operative relationship between the higher order element and the transfer device before the device is operated, and means for positively restoring the transfer devices.

48. In a machine of the class described, the combination with a totalizer, of a rotatable transfer device comprising two members rigid together, one to coöperate with but normally out of operative relationship with the higher order elements, means whereby rotation of the lower order totalizer element past transfer position will rotate the transfer device one step, a device for turning tripped transfer devices an additional step in the same direction as when tripped whereby to turn in the transfer, and means for shifting the totalizer laterally to establish operative relation between the higher order element and the transfer device before the second step of rotation of the latter.

In testimony whereof we affix our signatures in the presence of two witnesses.

THOMAS CARROLL.
JOHN P. FRANK.

Witnesses:
R. C. GLASS,
CARL BEUST.

Copies of this patent may be obtained for five cents each, by addressing the "Commissioner of Patents, Washington, D. C."